(12) United States Patent
Reid

(10) Patent No.: US 9,176,737 B2
(45) Date of Patent: Nov. 3, 2015

(54) CONTROLLING THE EXECUTION OF ADJACENT INSTRUCTIONS THAT ARE DEPENDENT UPON A SAME DATA CONDITION

(75) Inventor: Alastair David Reid, Fulbourn (GB)

(73) Assignee: ARM Limited, Cambridge (GB)

( * ) Notice: Subject to any disclaimer, the term of this patent is extended or adjusted under 35 U.S.C. 154(b) by 722 days.

(21) Appl. No.: 12/929,667

(22) Filed: Feb. 7, 2011

(65) Prior Publication Data

US 2012/0204007 A1    Aug. 9, 2012

(51) Int. Cl.
*G06F 15/00* (2006.01)
*G06F 7/38* (2006.01)
*G06F 9/00* (2006.01)
*G06F 9/44* (2006.01)
*G06F 9/30* (2006.01)
*G06F 9/38* (2006.01)

(52) U.S. Cl.
CPC ........ *G06F 9/30072* (2013.01); *G06F 9/30069* (2013.01); *G06F 9/3846* (2013.01); *G06F 9/3887* (2013.01)

(58) Field of Classification Search
None
See application file for complete search history.

(56) References Cited

U.S. PATENT DOCUMENTS

| | | | |
|---|---|---|---|
| 5,555,428 A | 9/1996 | Radigan et al. | |
| 5,799,180 A | 8/1998 | Shiell et al. | |
| 6,918,032 B1 | 7/2005 | Abdallah et al. | |
| 2006/0090063 A1* | 4/2006 | Theis | 712/239 |
| 2007/0220239 A1* | 9/2007 | Dieffenderfer et al. | 712/240 |
| 2010/0262813 A1 | 10/2010 | Brown et al. | |

FOREIGN PATENT DOCUMENTS

| | | |
|---|---|---|
| JP | 02-227731 | 9/1990 |
| JP | 04-137169 | 5/1992 |
| JP | 10-320380 | 12/1998 |
| JP | 11-085516 | 3/1999 |

OTHER PUBLICATIONS

Sohi et al. (Guarded Execution and Branch Prediction in Dynamic ILP Processors, Apr. 1994, pp. 120-129).*
Klauser et al. (Dynamic Hammock Predication for Non-predicated Instruction Set Architectures, Oct. 1998, pp. 278-285).*
Mahlke et al. (Effective Compiler Support for Predicated Execution using the Hyperblock, 1992, pp. 45-54).*

(Continued)

*Primary Examiner* — George Giroux
(74) *Attorney, Agent, or Firm* — Nixon & Vanderhye P.C.

(57) ABSTRACT

A data processing apparatus is disclosed, having: an instruction decoder configured to decode a stream of instructions, a data processor configured to process the decoded stream of instructions; wherein in response to a plurality of adjacent instructions within the stream of instructions execution of which is dependent upon a data condition being met and whose execution when said data condition is not met does not change a state of said processing apparatus, the processor is configured to: commence determining whether the data condition is met or not; and commence processing said plurality of adjacent instructions; and in response to determining that said data condition is not met; skip to a next instruction to be executed after said plurality of adjacent instructions without executing any intermediate ones of said plurality of adjacent instructions not yet executed and continue execution at the next instruction.

16 Claims, 10 Drawing Sheets

(56) References Cited

OTHER PUBLICATIONS

Kim et al., "Diverge-Merge Processor: Generalized and Energy-Efficient Dynamic Predication", IEEE Computer Society, Jan.-Feb. 2007, pp. 94-104.

International Search Report and Written Opinion of the International Searching Authority dated Jun. 13, 2012 in PCT/GB2012/050161.

Pnevmatikatos et al, "Guarded Execution and Branch Prediction in Dynamic ILP Processors", 1994, Computer Sciences Department University of Wisconsin-Madison, Madison, WI 53706, 10 pages.

Tyson, "The Effects of Predicated Execution on Branch Predication", 1994, Department of Computer Science University of California, Davis, CA 95616, 11 pages.

Kim et al., Wish Branches: Combining Conditional Branching and Predication for Adaptive Predicated Execution, 2005, Department of Electrical and Computer Engineering University of Texas at Austin, 12 pages.

English translation of Chinese Office Action dated Feb. 13, 2015 in CN 201280007860.7, 6 pages.

Japanese Office Action issued Jul. 28, 2015 in JP 2013-552260 and English translation, 24 pages.

GUGATech, "What is the relation between Branch Prediction and Pipeline?" C Magazine, Softbank Creative Inc. (currently SB Creative Corp.) Jan. 1, 2006, vol. 18, No. 1, pp. 98-102.

\* cited by examiner

SKIP $P_iL$ — pending_Skip = true
target_Skip = L
Register_Skip = P

FIG. 2a if pending_Skip
   if PC == target_Skip
      pending_Skip = False
   elsif resolved (Register_Skip)
      if Reg (Register_Skip) == 0
      PC = Target_Skip
      Pending_Skip = False

FIG. 2b

VLOOP P$_i$L  –   Pending_VLOOP = true
                  target_SKIP = PC+8
                  Register_SKIP = P If pending_VLOOP
    If resolved (Register_SKIP)
        If Reg (Register_SKIP) = = 0
            PC = Target_SKIP
            Pending_VLOOP = False

FIG. 3

CONTROLLING THE EXECUTION OF ADJACENT INSTRUCTIONS THAT ARE DEPENDENT UPON A SAME DATA CONDITION

BACKGROUND OF THE INVENTION

1. Field of the Invention

The field of the invention relates to data processing apparatus and in particular to the processing of predicated instructions that is instructions whose execution is dependent upon data conditions.

2. Description of the Prior Art

Conditional instructions whose execution is dependent upon particular data conditions are known. For example, the set of instructions CMP x y, ADDGE, SUBLIT compare two values stored in locations x and y and add them together if x is greater than or equal to y and subtract them from each other if x is less than y.

Vector instructions that perform operations on multiple data elements are becoming more common. They often use masks to control which elements are processed. For example, executing an 8-element vector store instruction using the mask 10000001 would only store 2 elements (the first and last). A common optimisation when writing vectorised code that uses masks in this way is to recognize that a sequence of instructions are all controlled by the same mask and to insert a branch around all of these instructions if the mask is zero, as in this case none of the instructions would do anything. Thus, the code would become:

| | |
|---|---|
| VCMP D0, D1, D2 | ; compare D1 and D2 put result mask in D0 |
| VTEST D0 | ;test if all bits in D0 are zero |
| BEQ L1 | ;if mask is zero skip the next 10 operations |
| D0 → VOP1 | ;perform vector operation 1 under control of mask D0 |
| D0 → VOP2 | ;perform vector operation 2 under control of mask D0 |
| . | |
| . | |
| . | |
| D0 → VOP10 | ;perform vector operation 10 under control of mask D0 |
| L1 | |

This is very effective if the mask is often zero as then the test and branch cost only two instructions and avoid the need to perform the 10 instructions that would be performed if the branch were absent. However, a problem with this prior art approach is that the branch is data dependent in that whether it is taken or not is dependent upon two data values D1 and D2. Data dependent branches are very hard to predict and thus, if branch prediction is used to speed up the operation the branch may often be mispredicted and if it is predicted to be taken when it should not have been taken the state of the machine will need to be rolled back to the state it was in before the branch was taken. When performing vector processing saving the state of the machine at a certain point is expensive in area due to the length of the data words.

It would be desirable to be able to improve the performance of conditional instruction execution

SUMMARY

A first aspect of the present invention provides a data processing apparatus comprising: an instruction decoder configured to decode a stream of instructions; a data processor configured to process said decoded stream of instructions; said data processor being configured to analyse said stream of instructions and to identify a plurality of adjacent instructions within said stream of instructions execution of which is dependent upon a data condition being met and whose execution when said data condition is not met does not change a value stored in a data register, and in response to identifying said plurality of adjacent instructions said data processor is configured to: commence determining whether said data condition is met or not; and commence processing said plurality of adjacent instructions; and in response to determining that said data condition is not met; skip to a next instruction to be executed after said plurality of adjacent instructions without executing any intermediate ones of said plurality of adjacent instructions not yet executed and continue execution at said next instruction.

The present invention recognises that where you have conditionally executed instructions that are all dependent on the same condition, and where their execution when the condition is not fulfilled does not affect the state of a data processing apparatus, then one can start processing these instructions before the condition has been determined and if it is found that these instructions should not be executed one can at this point skip to the end of these instructions. In this regard not changing the state of the data processing apparatus, is used to mean that the data values stored in data registers are not changed, thus, the instructions do not overwrite any values stored and as such, no state restoration needs to be performed in the case that they should not have been executed. In this regard execution of an instruction will change such things as the value of a program counter and perhaps a cache, however where there is no change to values in destination registers of the instructions executed then there is no rollback required if the instructions have executed when they should not have as their execution will not affect the execution of future instructions. Thus, where no state restoration is required one can view the state as not having changed.

Thus, one achieves the benefit of skipping execution of some instructions with the associated performance and power advantages without the drawback of needing to perform additional restoration steps. It should be noted that there is a small overhead associated with the additional circuitry required to process this "skip" step.

In some embodiments said data processing apparatus further comprises a data store, said data processing apparatus being responsive to said plurality of adjacent instructions to store in said data store an identifier identifying a location of said next instruction to be executed after execution of said plurality of adjacent instructions as a target location and to set a skip flag within said data store, said skip flag indicating to said processor that in response to said data condition not being met said processor should update a program counter with an address corresponding to said target location.

Although the skipping of the instructions can be implemented in a number of ways, in some embodiments, detection of the plurality of adjacent instructions triggers the processor to set a skip flag and to store an indication of a target location, the skip flag indicating to the processor that when it has determined that the condition is not met it can skip to the target location. That is it can stop executing the plurality of adjacent instructions and can continue executing an instruction at the target location, any of the adjacent instructions that have not been executed at that point will not be executed as at this moment one knows that the condition that they are dependent on is not fulfilled In some embodiments, said identifier identifying a location of said next instruction comprises an address.

The target location that the execution of instructions is to skip to can be indicated in a number of ways, in some embodiments it simply comprises an address. If this is the case, the program counter can simply be updated with this information. In other embodiments, the information might be stored as an identifier identifying the number of adjacent instructions in which case, a counter can be updated with this value and it can be decremented each time an instruction is executed and at a point that it is determined that the condition is not fulfilled the program counter can be updated using the information from the counter.

In some embodiments, said plurality of adjacent instructions comprise vector instructions for processing vector data elements, each vector instruction comprising a mask controlling which elements in said vector data elements are processed, said data condition not being met comprising said mask comprising zeros indicating no data elements are to be processed.

This technique is particularly advantageous when used with vector instructions. When processing vector data elements, if one were to use a branch instruction to branch around the conditional instructions, then in order to account for any misprediction the state of the processor at the branch would need to be stored. With vector data elements, storage of this state is very costly as these data elements are large. Thus, as the present technique avoids the need for ever rolling back so that no state needs to be stored, it is very advantageous when used with vector data elements.

The processing of vector data elements is often controlled using a vector mask which controls which elements in the vector data element are to be processed. If the mask is all zeros, then this indicates that none of the elements are to be processed. Thus, embodiments of the present invention can have as the data condition the mask not being zeros. Thus, if the data condition is not met the mask is all zeros, at which point one knows that execution of the instructions will not change the state of the processor and in fact is not required and one can skip any of these instructions not yet executed. One also knows that any intermediate instructions that have been executed but were not required have not changed the state of the processor and thus, no rolling back of state is needed.

In some embodiments, said plurality of adjacent instructions comprise a plurality of instructions each comprising a same predicate said predicate determining said data condition, said instructions only completing and updating any stored data values in response to said predicate being met, said data processing apparatus being configured to: commence processing said plurality of adjacent instructions; and in response to determining that said data condition is not met; terminate execution of said plurality of adjacent instructions such that no stored data values are updated; skip to a next instruction subsequent to said plurality of adjacent instructions without executing any intermediate ones of said plurality of adjacent instructions not yet executed and to continue execution at said next instruction.

The present technique is also suitable for use with instructions that execute in dependence upon predicates. Such instructions only complete and update a state of the processor once it is determined that the predicate condition is met. However, they do start processing the data before the result of the predicate is known. Thus, these instructions can also be executed before the condition or result of the predicate is known. If the predicate is not met then they will not have written any of their calculations to store so the state of the processor will not have changed and although they have started their execution, no state needs to be rolled back. Thus, if a plurality of these instructions are adjacent to each other it is advantageous to start processing them and in response to determining that the predicate condition is not met to terminate execution of the plurality of adjacent instructions and to skip to a next instruction subsequent to them.

In some embodiments, said data processing apparatus further comprises a data store and detection circuitry; said detection circuitry being responsive to detection of a conditional branch instruction dependent on said data condition not being met to branch forward around said plurality of adjacent instructions to: store a value indicating a target location of said branch instruction in said data store as said target location and to set said skip flag value within said data store; said processor being responsive to said skip flag not to take said branch and to commence determination of whether said data condition is met or not; to commence execution of said plurality of adjacent instructions; and in response to determining that said data condition is not met to set a program counter to a value dependent upon said target location.

As noted in the introduction of this application, a conventional way of dealing with these plurality of adjacent instructions is to branch around them. Thus, if the data processing apparatus is configured to detect a conditional branch instruction that is dependent upon a data condition followed by a plurality of these adjacent instructions it may be advantageous to instigate the skip procedure rather than taking the branch. Thus, rather than taking the branch and having to store the state in case the branch is mispredicted the data processing apparatus recognises the pattern of instructions and starts to process the adjacent instructions having set the skip flag such that when it determines whether the condition is met or not it can, if the condition is not met, skip to the end of these adjacent instructions, whereas if the condition is met it simply proceeds to execute all of the adjacent instructions and clears the skip flag.

In some embodiments, said conditional branch instruction is conditional upon a vector value said processor commences said determination of whether said data condition is met or not by executing a vector test instruction testing a value of said vector and in response to said vector value being determined to comprise a predetermined value it being determined that said data condition is not met.

In some embodiments, the conditional branch instruction is conditional upon a vector value. In such a case the processor will commence determination of whether the data condition is met or not by executing a vector test instruction and will then start to execute the plurality of adjacent instructions. When a result from the vector test instruction has been received, if it indicates that the condition is not met the processor will skip to the end of the adjacent instructions and continue processing from a next instruction.

In some embodiments, said data processing apparatus further comprises a data store and detection circuitry; said detection circuitry being responsive to detection of a conditional branch instruction dependent on said data condition to branch backwards to a start of said plurality of adjacent instructions to: store a location of said branch instruction incremented by one in said data store as said target location and to set a skip flag value within said data store; said processor being responsive to said skip flag to take said branch and to determine if said data condition is met or not; and to commence execution of said plurality of adjacent instructions; and in response to determining that said data condition is not met to set a program counter to a value dependent upon a value stored in said data store as said target location.

Embodiments of the present invention can also be used to address backward branches where a string of adjacent instructions conditional on a same condition are branched to by a backwards branch. In this case, when the processing apparatus recognises this pattern of instructions, it will take the branch and start to execute the adjacent instructions. However, once it is determined whether the condition is met or not, if the condition is not met then it will stop executing the adjacent instructions and will continue executing at a subsequent instruction in the program stream subsequent to the branch that it took.

Once again, if the conditional branch instruction is conditional upon a vector then the processor determines whether the data condition is met or not by executing a vector test instruction which tests a value of the vector.

In some embodiments, the data processing apparatus further comprises a data store and detection circuitry; said detection circuitry being responsive to detection of an instruction indicating said plurality of adjacent instructions dependent on said data condition follow said instruction, said instruction comprising said data condition and an indication if it should be met or not for each instruction to be completed; to store an identifier identifying a location of said next instruction following said plurality of instructions as said target location and to set a skip flag value within said data store; said processor being responsive to said skip flag to skip to said target location in response to determining that said data condition is not met.

In some embodiments there is detection circuitry provided for detecting a pattern of instructions where implementing the skip function would be advantageous.

In some embodiments, in response to determining that said data condition is met, said processor is configured to continue to execute said plurality of adjacent instructions and to clear said skip flag.

If the processor determines that the data condition is met then the plurality of adjacent instructions do need to be executed, in which case the processor continues to execute them and it clears the skip flag.

In some embodiments, in response to executing all of said adjacent instructions before said data condition is determined said processor is configured to clear said skip flag.

Furthermore, if the data condition is not determined before all the adjacent instructions have been executed, then it is no longer relevant as to whether or not the processor should skip and the skip flag should be cleared in this case too.

A second aspect of the present invention provides a data processing apparatus comprising: an instruction decoder configured to decode at least one skip instruction, said at least one skip instruction specifying a target register and a data condition register; a data processor configured to perform data processing operations controlled by said instruction decoder wherein: said data processor is responsive to said decoded at least one skip instruction to commence determining said data condition and to commence processing subsequent instructions within said instruction stream, and in response to determining that said data condition does not have a predetermined outcome to set a program counter to a value dependent on a value stored in said target register.

Although the data processor can generate the functionality of a skip instruction having detected a pattern of instructions, in some embodiments the skip instruction is an actual instruction that the processor will decode and execute and then perform the skip functionality.

In some embodiments, said instruction decoder is responsive to said at least one skip instruction to set a skip flag in said data store.

The decoder may respond to the skip instruction in a number of ways, but in some embodiments it sets a skip flag which indicates to the processor that it is awaiting the result of the determination regarding the data condition, and that once it has that result if the condition is not met then it needs to perform the skip function.

A third aspect of the present invention provides a data processing apparatus comprising: an instruction decoder configured to decode at least one loop instruction, said at least one loop instruction specifying a target register and a data condition register; a data processor configured to perform data processing operations controlled by said instruction decoder wherein: said data processor is responsive to said decoded at least one loop instruction to commence determining said data condition and to set said program counter to an address of a previously executed instruction at a start of said loop and to commence processing instructions within said instruction stream, and in response to determining that said data condition does not have a predetermined outcome to set a program counter to a value dependent on a value stored in said target register.

An additional instruction which may be available is the loop instruction, which allows one to skip adjacent instructions that one takes a backwards branch to once one determines that the condition they are dependent on is not met.

A fourth aspect of the present invention provides a method of compiling an application for execution by a data processor comprising the steps of analysing a plurality of instructions within said application; generating a stream of instructions including a skip instruction followed by a plurality of adjacent instructions execution of which is dependent upon a same data condition and whose execution when said data condition is not met does not change a value stored in a data register; said skip instruction specifying a target address, said target address being an address of a next instruction subsequent to said adjacent instructions and said data condition, said skip instruction when executed by said data processor controlling said data processor to commence determination of whether said data condition is met or not; and commence processing of said plurality of adjacent instructions; and in response to determining that said data condition is met; skipping to a next instruction subsequent to said plurality of adjacent instructions without executing any intermediate ones of said plurality of adjacent instructions not yet executed and to continue execution at said next instruction; and in response to determining that said data condition is not met continuing to execute said plurality of adjacent instructions.

A compiler can also generate a skip instruction in response to analysing code and determining that there are a plurality of adjacent instructions that are all dependent on a same data condition and execution of which if the data condition is not met will not change the state of the processor. In this way, the compiler provides an optimisation of the code before it is executed by the processor.

A fifth aspect of the present invention provides a method of compiling an application for execution by a data processor comprising the steps of analysing a plurality of instructions within said application; generating a stream of instructions including a loop instruction specifying an address of a first of a plurality of adjacent instructions to jump to, said plurality of adjacent instructions comprising instructions whose execution is dependent upon a same data condition and whose execution when said data condition is not met does not change a value stored in a data register; said loop instruction specifying said data condition and a target address, said target address being an address of a next instruction subsequent to said loop instruction, said loop instruction when executed by said data processor controlling said data processor to commence determination of whether said data condition is met or not; and jump to and commence processing of said plurality of adjacent instructions; and in response to determining that said data condition is met; skipping to said instruction specified by said target address without executing any intermediate ones of said plurality of adjacent instructions not yet executed and continuing execution at said instruction; and in response to determining that said data condition is not met continuing to execute said plurality of adjacent instructions.

The compiler may also generate a loop instruction in response to detecting backward branches to the plurality of adjacent conditional instructions. Once again this can improve the performance of a processor processing such instructions.

A sixth aspect of the present invention provides a computer program product for controlling an apparatus to perform a method according to a fifth or sixth aspect of the present invention.

A seventh aspect of the present invention provides a method of processing data comprising the following steps: decoding a stream of instructions; processing said decoded stream of instructions; in response to a plurality of adjacent instructions within said stream of instructions execution of which is dependent upon a data condition being met and whose execution when said data condition is not met does not change a value stored in a data register: commence determining whether said data condition is met or not; and commence processing said plurality of adjacent instructions; and in response to determining that said data condition is not met; skip to a next instruction to be executed after said plurality of adjacent instructions without executing any intermediate ones of said plurality of adjacent instructions not yet executed and continue execution at said next instruction.

An eighth aspect of the present invention provides a virtual machine provided by a computer program executing upon a data processing apparatus, said virtual machine providing an instruction execution environment according to the data processing apparatus of a first aspect of the present invention.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 2a and b show an example of a skip instruction;

FIG. 3 shows an example of a loop instruction;

DESCRIPTION OF EXAMPLE EMBODIMENTS

Figure 1:
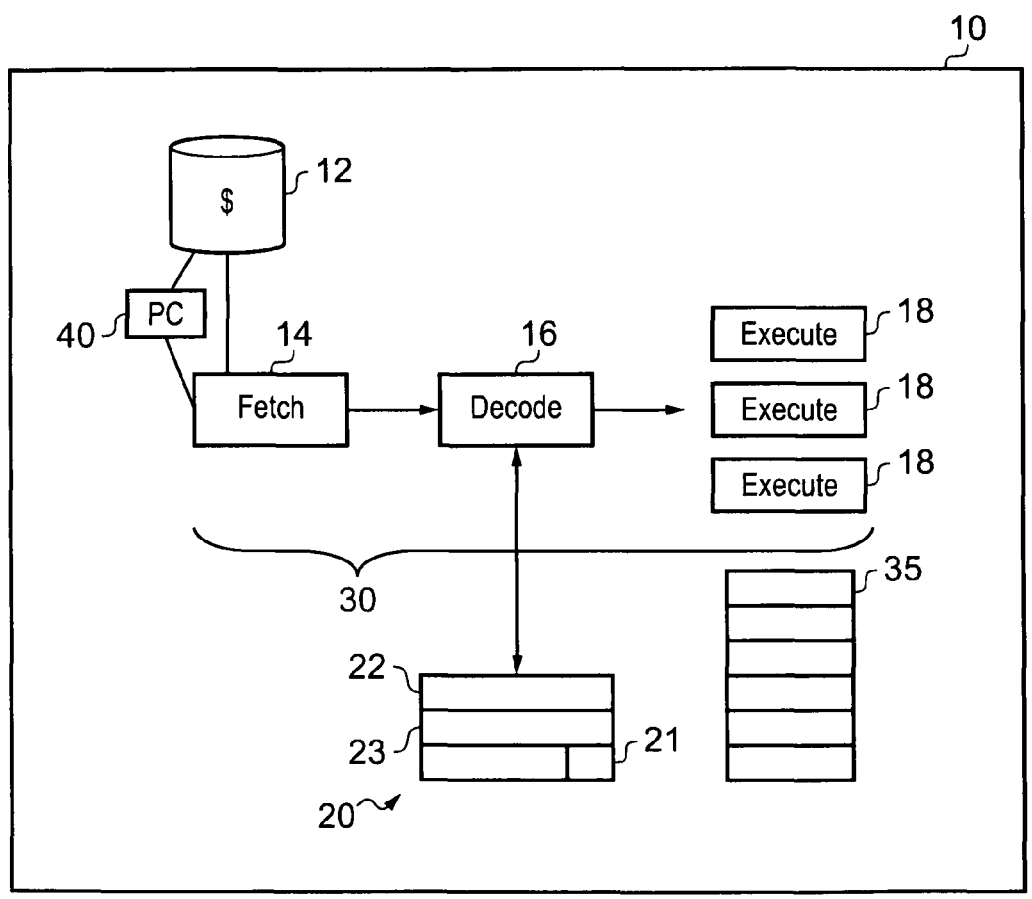
FIG. 1 shows a data processing apparatus according to an embodiment of the present invention.

FIG. 1 shows a data processing apparatus 10 for processing an instruction stream according to an embodiment of the present invention. Data processing apparatus 10 has an instruction cache 12 for storing instructions to be processed. These instructions are fetched by fetch unit 14 in dependence upon the value in program counter 40. The fetched instructions are sent to instruction decoder 16 for decoding and are then executed by one of the parallel execution pipelines 18. The fetch unit, decode unit and execution pipelines form processing circuitry 30 for processing the instructions. There is also a data store 20 that comprises registers holding control values controlling the execution of the instructions and a further data store 35 comprising registers for storing data values that are processed by the instructions executing. It should be noted that data store 20 and data store 35 may in some embodiments form a single register bank.

In an embodiment of the present invention, the instructions fetched include a skip instruction followed by a plurality vector instructions that are all conditional on a vector mask not being 0. If the vector mask is 0 then no operation is performed on any of the data elements in response to the plurality of vector instructions. The skip instruction contains one register specifier which identifies the register containing the vector mask and an instruction address which is the target address, that is the address of an instruction subsequent to the last of the plurality of vector instructions in the instruction stream.

The decoder when decoding the skip instruction writes the value of the target address into register 22, and the address of the vector mask register into register 23 and it sets a skip flag in register 21. The skip flag indicates to processing circuitry 30 that a skip is pending and that if it is determined that a data condition is not met, in this case that the vector mask register contains zeros, then the program counter 40 should be set to the value in the target register 22.

Thus, in response to the skip instruction the decoder writes these values in data store 20 and one of the pipelines 18 executes a vector test instruction that checks the value of the vector mask register to see if it is 0. The first conditional vector instruction in the consecutive conditional vector instructions is then executed in another of the parallel pipelines 18. The decode and fetch unit continue to fetch and decode these consecutive instructions until the vector test operation determines a result for the vector mask. If the vector mask is 0 then the program counter is set to the target value of the skip instruction and this is the next instruction that is fetched. If the vector mask is not 0 then the skip flag set in response to the skip instruction in data store 20 is reset such and the consecutive instructions are all executed.

It should be noted that although if the vector mask is 0 some instructions may have been executed that don't need to be executed while the value of the vector mask register was being determined, the vector mask being 0 means that no element is stored from these operations and thus, the data values in registers 35 are not overwritten and the state of the processor is not changed in that no state needs to be restored and the processor can simply skip to the target instruction.

FIGS. 2a and 2b shows an example of the skip instruction and how the processor implements it. Thus, SKIP P,L indicates an optional branch to an address L that depends on a condition P.

Following the skip instruction, if the processor is able to immediately resolve the condition P the processor will branch immediately to address L. If the processor is not able to resolve the condition immediately then it will continue executing the subsequent instructions that are conditional upon value P. The processor "remembers" that it has an unresolved skip by modifying the following three registers. It modifies the skip flag register by setting pending_skip to true.

It modifies the target_skip register by setting it to L, L being the address to branch to and it sets register_skip to P, which in this case is the vector mask register.

FIG. 2b shows how the processor acts for this instruction. While the pending skip flag is set (pending_skip=true) if the program counter reaches the target address of the skip instruction then the skip flag is reset to (pending_skip=false) as at this point all the consecutive instructions have been executed and therefore the skip is no longer pending. Furthermore, if the condition that the skip instruction is dependent on is resolved, in this case if the vector mask register is 0 then the program counter is set to the target_skip address and all the intermediate consecutive instructions are skipped. At this point the skip flag is again reset to false.

It should be noted that although setting the pending skip flag and allowing the processor not to process instructions whose conditions are not met will improve performance of the processor, it is not essential and the processor will still execute correctly if these instructions are not skipped. Thus, at any point the processor can reset the skip flag. It may do this where the comparison for determining whether the condition is met or not is difficult to perform and is therefore unlikely to be performed before the instructions that are conditional upon it. This is done as by resetting the skip flag the processor frees up the registers that store the target address the vector mask and the flag.

It should be noted that although in the example given above the skip instruction specified an address, it could rather specify a number of instructions or a number of instruction bytes to skip. If this implementation were used then in response to executing the skip instruction a counter will be set to this number and it will be decremented for each instruction of the consecutive instructions that is executed. When the counter hits 0 one has exited the skip region and the skip flag is reset. If however, the counter did not reach 0 and the vector mask was found to be 0 then the number of instructions left in the counter would be skipped, in other words the program counter would be incremented by this value.

An alternative to specifying the address of the predicate register would be where there is a global register used for vector masks. In this case, the register would not need to be specified within the skip instruction as one would know that the skip instruction was always referring to this register.

FIG. 3 shows a variant of the skip instruction, the VLOOP instruction and the behaviour that this instruction has.

Figure 4:
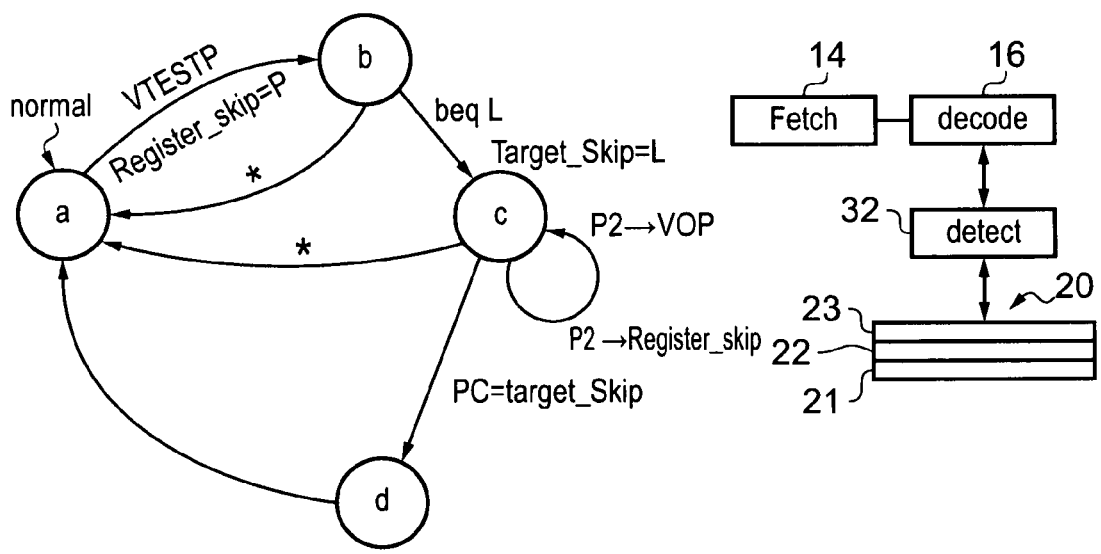
FIG. 4 shows states entered by a processing apparatus in an instruction pattern spotting mode.

In this case the code of interest is a loop that iterates until a mask becomes all 0. This code differs in several key ways to the skip code above as it uses a backwards branch and in this case we must speculate that the branch is taken which again corresponds to speculating that the mask is not 0. Once again (as shown in FIG. 4) the same registers as those used for the skip instruction in FIG. 2 are used for the VLOOP instruction to indicate the target register and the predicate register but a different flag is set to indicate that it is a VLOOP that is pending rather than a skip instruction. As in the skip instruction once it is determined that the predicate is all zero, the processor skips to the target address. At this point the VLOOP flag is reset to false.

In the example just given the skip and loop operations were implemented architecturally in that they were new instructions. They could also be implemented in a micro-architectural way wherein an early stage of the decoder or a pre-decoder could spot a sequence of operations controlled by the same predicate and where their operation if the condition is not met does not change the architectural state it could implement either the skip or the loop operation. It should be noted that spotting this sort of pattern is particularly simple for vector instructions such as those given in the introduction to this application where they are dependent on a global register and they all behave like no ops if the global register is identically equal to 0.

FIG. 4 illustrates schematically different states that the processing apparatus 10 would operate in, in this pattern spotting mode. Thus, fetch unit 14 will fetch the instructions and an early stage of decode 16 will detect a particular pattern code. In this example, the processor is operating in a normal "a" state and in response to detecting a vector test operation VTEST testing a particular vector mask register P it sets the register_skip 22 to this vector mask value. It then proceeds to state b. If the subsequent instructions are normal instructions it will return to state a along route *, as at this point it recognises that the pattern of instructions that it is spotting is not there. If however, there is a branch instruction that is dependent on the predicate register P it will set the target_skip register 23 to the target value of the branch, in other words L and it will proceed to state c. In state c it will process the consecutive operations that are dependent on the vector mask register until the value of the vector mask register is determined. If the value of the vector mask register is 0 then it will proceed to state d by setting the program counter to the value of target skip. It will then execute the instruction at this address and will return to normal state a. If during operation of the consecutive instructions it was found that the vector mask was not 0 or the program counter rose to above target skip then it will return to normal state a along the routes marked by *.

Figure 5:
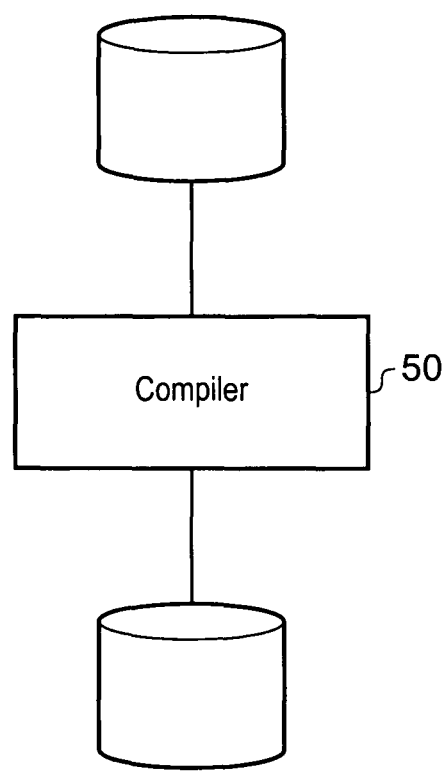
FIG. 5 schematically shows a compiler according to an embodiment of the present invention.

FIG. 5 shows a compiler 50 according to an embodiment of the present invention. Compiler 50 receives a program written by a programmer and turns it into code that is processed by the processor. When doing this it performs steps to optimise the code such that it is run more efficiently. In an embodiment of the present invention it performs similar pattern matching steps to those performed by the early stage of the decoder described with respect to FIG. 4, and generates code that controls a process to perform the skip or loop functions as appropriate.

A further instruction that the skip function can be used in conjunction with is the Thumb IT instruction that indicates that various operations should be executed dependent on particular conditions. Thus an ITTTGE instruction indicates that the next 3 operations should be performed if one value is greater or equal to another. As the results of these operations are not written back until the result of the condition is known, a skip flag could be set and if it was determined that the condition GE was not met before the first three operations were complete then the processor could skip to a fourth operation.

Figure 6:
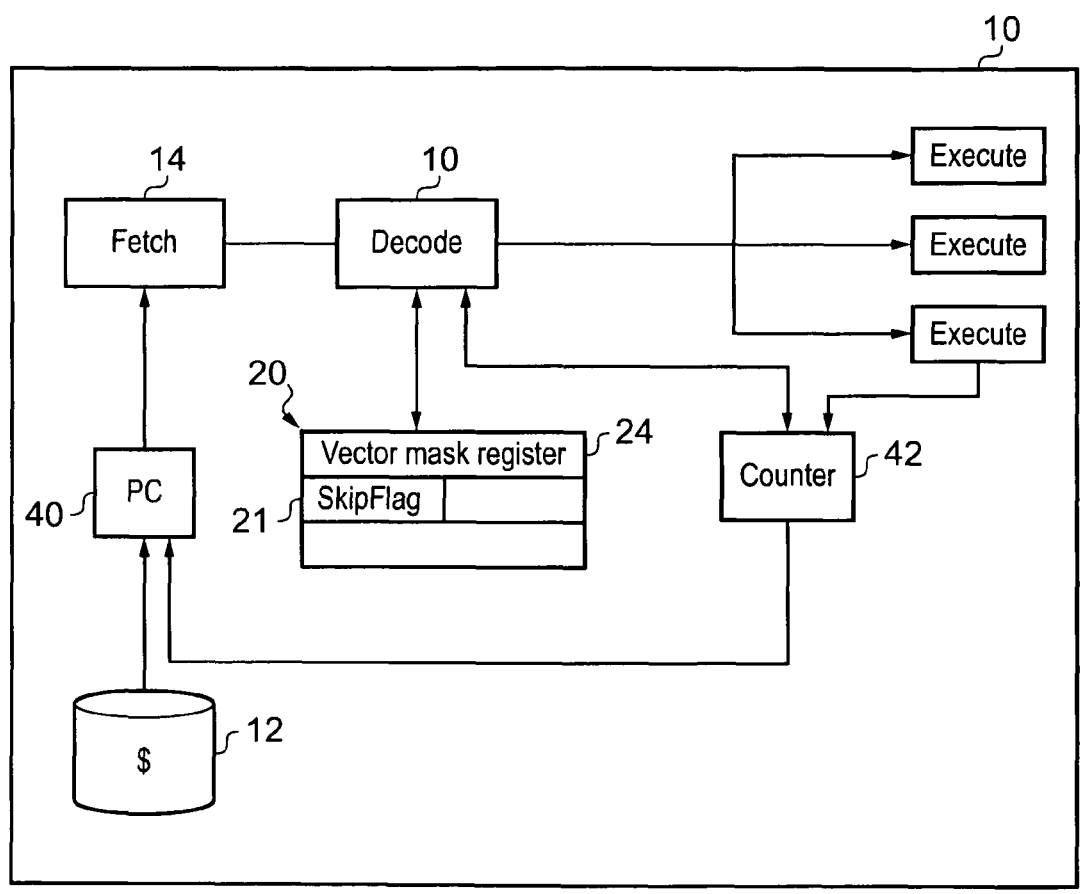
FIG. 6 shows a data processing apparatus according to a further embodiment of the present invention.

FIG. 6 shows an alternative embodiment of data processing apparatus 10, wherein there is a register 24 within in register bank 20 that is configured to store pending vector masks. Thus, the skip and vloop instructions do not specify a vector mask register. In this embodiment, rather than setting a target address in a register, the number of instructions that are conditional on the condition, such as the vector mask for a skip instruction are set in the counter 42. As each of these instructions is executed a signal is sent to the counter and it is decremented. If the condition is determined not to be met while the conditional instructions are still being executed then the program counter 40 is updated by adding the value in counter 42 to it.

Figure 7:
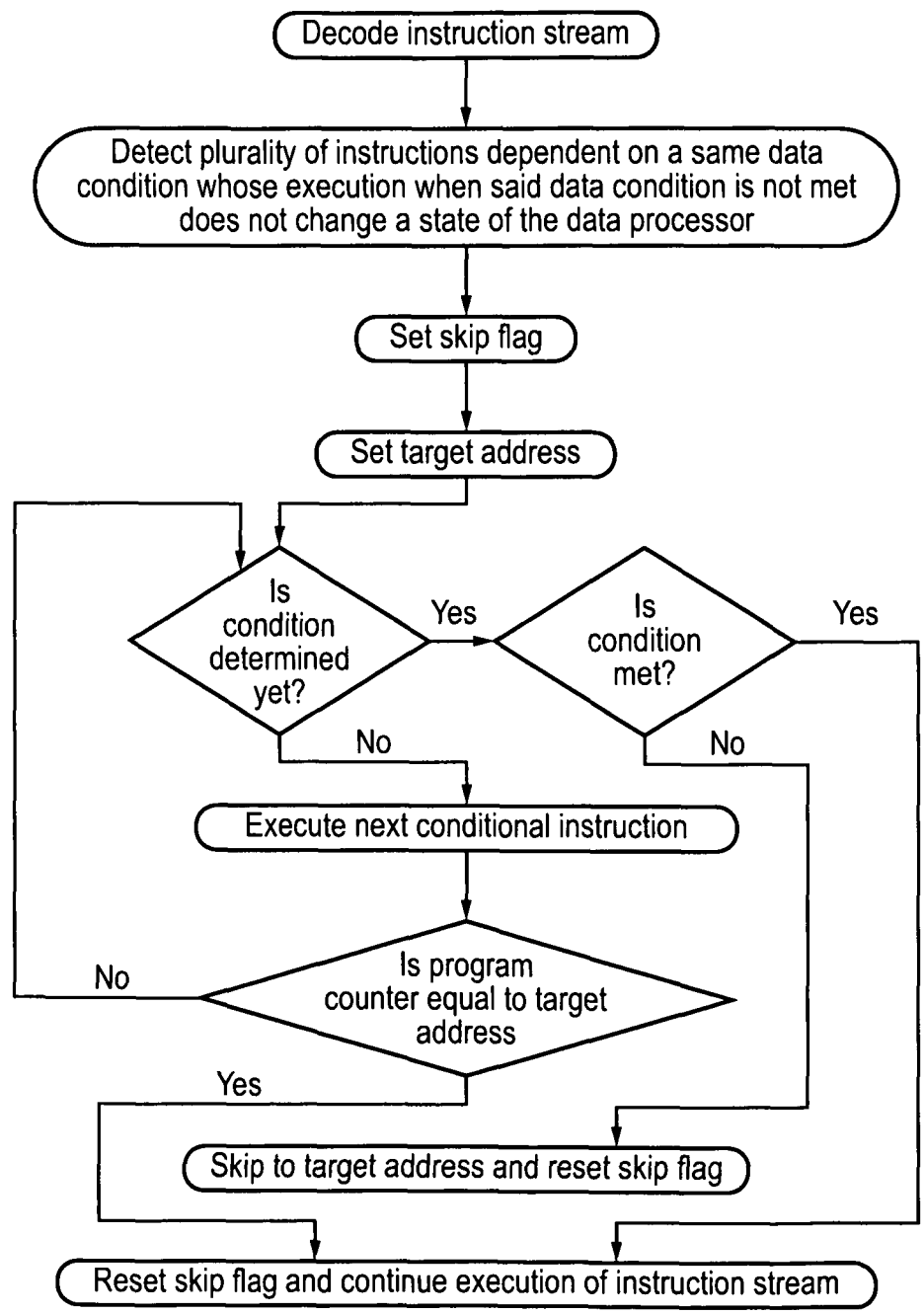
FIG. 7 shows a flow diagram illustrating steps in a method for performing a skip operation according to an embodiment of the present invention.

FIG. 7 shows a flow diagram illustrating steps in a method for processing an instruction stream according to an embodiment of the present invention. An instruction stream is decoded, and the decoder detects a plurality of instructions that are dependent on a same data condition and whose execution when said data condition is not met does not change a state of the data processor. In response to detecting this, or in other embodiments in response to decoding a skip instruction, the decoder sets a skip flag and writes a target address of the skip operation to a target address register. This target address is specified in the skip instruction in the case that the decoder is decoding a skip instruction or in the case of detecting a plurality of instructions dependent on the same data condition it is the address of the instruction subsequent to these instructions.

The processor then determines if the outcome data condition has been determined yet or not. If it has not been determined then a first of the adjacent conditional instructions is executed. It is then determined if the program counter is greater than the target address, if it is not then if the condition is still not determined a subsequent conditional instruction is executed and the program counter checked again.

If at some point the outcome of the condition is determined then if it is met, the skip flag is reset and execution of the conditional instructions is continued with. If the condition is not met then the program skips to the target address by setting the program counter to the target address and the skip flag is reset.

If however, before the condition outcome is determined the program counter reaches the target address then the skip flag is reset and execution of the instruction stream continues in the normal way.

Figure 8:
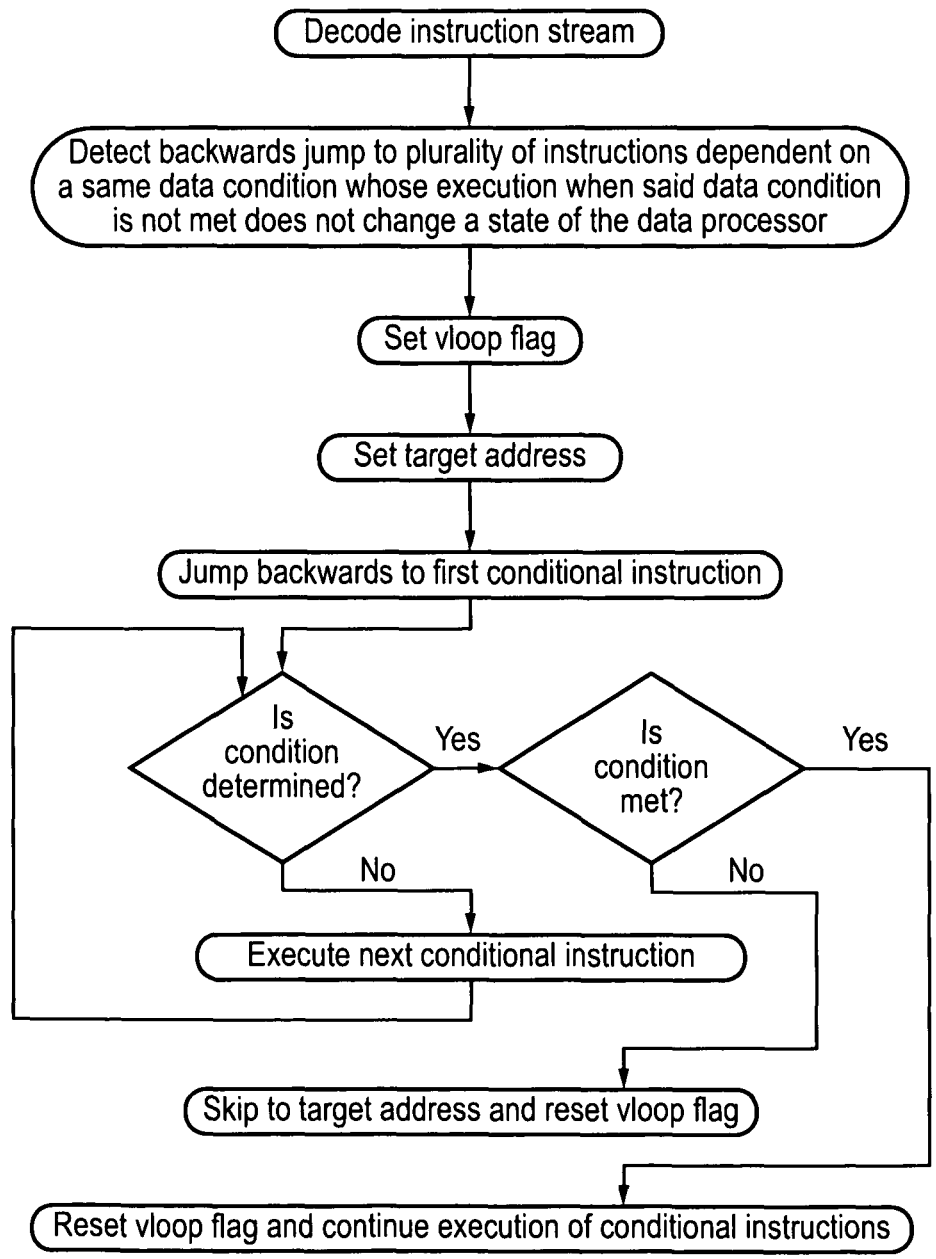
FIG. 8 shows a flow diagram illustrating steps in a method for performing a loop operation according to an embodiment of the present invention.

FIG. 8 shows a flow diagram illustrating steps in a method for processing an instruction stream including a backwards jump to a plurality of conditional instructions. An instruction stream is decoded, and the decoder detects a backwards jump to a plurality of instructions that are dependent on a same data condition and whose execution when said data condition is not met does not change a state of the data processor. In response to detecting this, or in other embodiments in response to decoding a loop instruction, the decoder sets a vloop flag and writes a target address of the loop operation to a target address register. This target address is the current program counter incremented by one.

The processor then jumps backwards to the first conditional instruction. It is then determined if the condition outcome has been determined yet or not. If not then the next conditional instruction is executed and it is determined again. If the condition has been determined, if it has been met then the vloop flag is reset and execution of the conditional instructions continues. If it has not been met the program jumps to the target address and resets the vloop flag. If the condition is not determined while the conditional instructions are being executed then a branch back to the target address will occur in the program stream and at this point the vloop flag will be reset. These steps are not shown.

Figure 9:
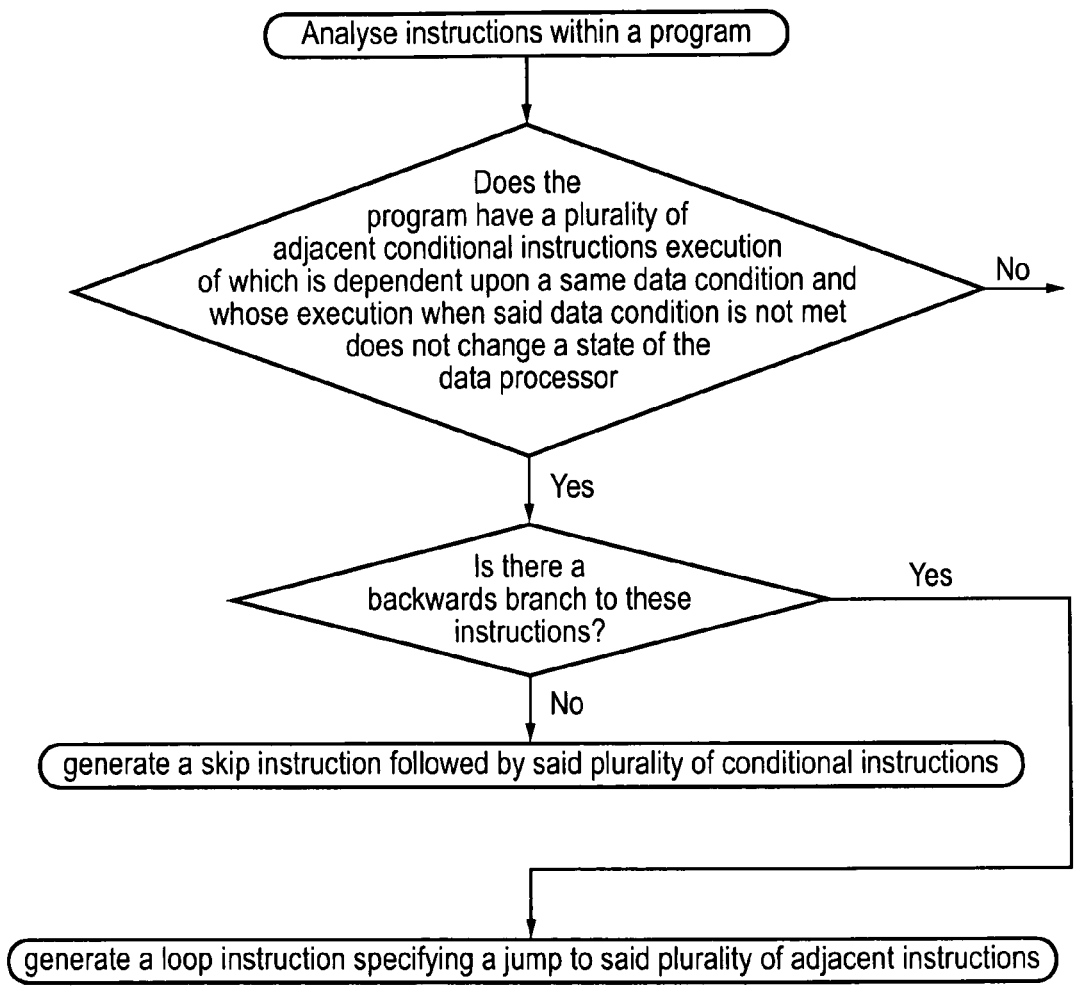
FIG. 9 shows steps in a method of compiling a program including generating loop and skip instructions.

FIG. 9 shows steps in a method of compiling a program. The instructions within the program are analysed and it is determined if there are a plurality of adjacent conditional instructions that are dependent on a same data condition and execution of which do not change a state of the processor. If these are detected, it is determined if there is a backwards branch to these instructions. If there is not, a skip instruction is generated and placed in the instruction stream followed by the plurality of conditional instructions. If there is a backwards branch then a loop instruction is generated.

Figure 10:
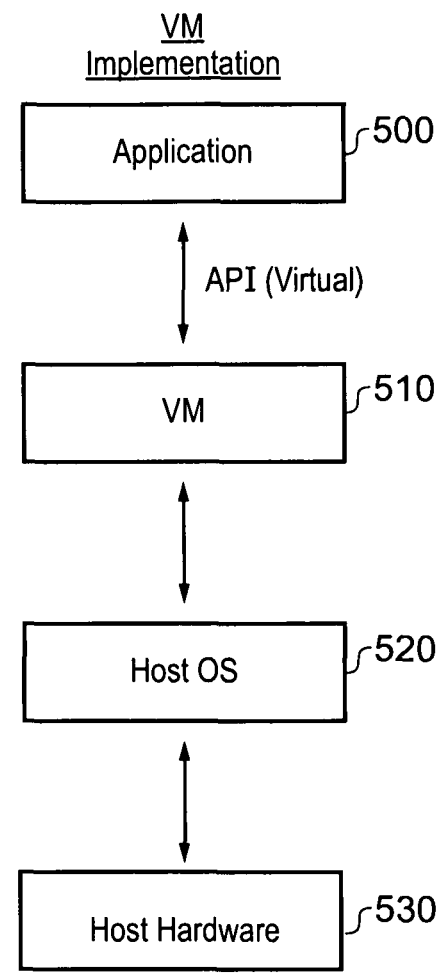
FIG. 10 shows a virtual machine implementation of an embodiment of the present invention.

FIG. 10 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

I claim:

1. A data processing apparatus comprising:
an instruction decoder configured to decode a stream of instructions;
a data processor configured to process said decoded stream of instructions; wherein
said data processor is configured to analyse said stream of instructions and to identify a plurality of adjacent instructions within said stream of instructions execution of which is dependent upon a data condition being met and whose execution when said data condition is not met does not change a value stored in any data register, and in response to identifying said plurality of adjacent instructions said data processor is configured to:
commence determining whether said data condition is met or not; and
commence processing said plurality of adjacent instructions without waiting for a determination of whether said data condition is met or not; and
in response to determining that said data condition is not met, skip to a next instruction to be executed after said plurality of adjacent instructions without executing any intermediate ones of said plurality of adjacent instructions not yet executed and without restoring state to data registers, and continue execution at said next instruction.

2. A data processing apparatus according to claim 1, said data processing apparatus further comprising a data store, said data processing apparatus being responsive to said plurality of adjacent instructions to store in said data store an identifier identifying a location of said next instruction to be executed after execution of said plurality of adjacent instructions as a target location and to set a skip flag within said data store, said skip flag indicating to said processor that in response to said data condition not being met said processor should update a program counter with an address corresponding to said target location.

3. A data processing apparatus according to claim 2, wherein said identifier identifying a location of said next instruction comprises an address.

4. A data processing apparatus according to claim 2, said data processing apparatus further comprising a data store and detection circuitry;
   said detection circuitry being responsive to detection of a conditional branch instruction dependent on said data condition not being met to branch forward around said plurality of adjacent instructions to:
   store a value indicating a target location of said branch instruction in said data store as said target location and to set said skip flag value within said data store;
   said processor being responsive to said skip flag not to take said branch and to commence determination of whether said data condition is met or not;
   to commence execution of said plurality of adjacent instructions; and
   in response to determining that said data condition is not met to set a program counter to a value dependent upon said target location.

5. A data processing apparatus according to claim 4, wherein said conditional branch instruction is conditional upon a vector value, said processor commences said determination of whether said data condition is met or not by executing a vector test instruction testing a value of said vector, and in response to said vector value being determined to comprise a predetermined value it being determined that said data condition is not met.

6. A data processing apparatus according to claim 2, said data processing apparatus further comprising a data store and detection circuitry;
   said detection circuitry being responsive to detection of a conditional branch instruction dependent on said data condition to branch backwards to a start of said plurality of adjacent instructions to:
   store a location of said branch instruction incremented by one in said data store as said target location and to set a skip flag value within said data store;
   said processor being responsive to said skip flag to take said branch and to determine if said data condition is met or not; and
   to commence execution of said plurality of adjacent instructions; and
   in response to determining that said data condition is not met to set a program counter to a value dependent upon a value stored in said data store as said target location.

7. A data processing apparatus according to claim 6, wherein said conditional branch instruction is conditional upon a vector value, said processor commences said determination of whether said data condition is met or not by executing a vector test instruction testing a value of said vector, and in response to said vector value being determined to comprise a predetermined value it being determined that said data condition is not met.

8. A data processing apparatus according to claim 2, further comprising a data store and detection circuitry;
   said detection circuitry being responsive to detection of an instruction indicating said plurality of adjacent instructions dependent on said data condition follow said instruction, said instruction comprising said data condition and an indication if it should be met or not for each instruction to be completed;
   to store an identifier identifying a location of said next instruction following said plurality of instructions as said target location and to set a skip flag value within said data store;
   said processor being responsive to said skip flag to skip to said target location in response to determining that said data condition is not met.

9. A data processing apparatus according to claim 2, wherein in response to determining that said data condition is met, said processor is configured to continue to execute said plurality of adjacent instructions and to clear said skip flag.

10. A data processing apparatus according to claim 2, wherein in response to executing all of said adjacent instructions before said data condition is determined said processor is configured to clear said skip flag.

11. A non-transitory computer readable medium storing as a computer program a virtual machine for executing upon a data processing apparatus, said virtual machine providing an instruction execution environment according to the data processing apparatus as claimed in claim 1.

12. A data processing apparatus comprising:
    an instruction decoder configured to decode a stream of instructions;
    a data processor configured to process said decoded stream of instructions; wherein
    said data processor is configured to analyse said stream of instructions and to identify within said stream of instructions a plurality of vector instructions for processing vector data elements, each vector instruction comprising a mask controlling which elements in said vector data elements are processed, and in response to identifying said plurality of vector instructions said data processor is configured to:
    commence determining whether said mask comprises zeros indicating no data elements are to be processed; and
    commence processing said plurality of vector instructions without waiting for a determination of whether said mask comprises said zeros; and
    in response to determining that said mask comprises said zeros, skip to a next instruction to be executed after said plurality of vector instructions without executing any intermediate ones of said plurality of vector instructions not yet executed and without restoring state to data registers, and continue execution at said next instruction.

13. A method of compiling an application for execution by a data processor comprising the steps of:
    analysing a plurality of instructions within said application;
    detecting whether said plurality of instructions include a plurality of adjacent instructions execution of which is dependent upon a same data condition and whose execution when said data condition is not met does not change a value stored in any data register;
    if said plurality of instructions include said plurality of adjacent instructions, then generating a stream of instructions including a skip instruction followed by said plurality of adjacent instructions;
    said skip instruction specifying a target address and said data condition, said target address being an address of a next instruction subsequent to said adjacent instructions, said skip instruction, when executed by said data processor, controlling said data processor to:
    commence determination of whether said data condition is met or not; and
    commence processing of said plurality of adjacent instructions without waiting for the determination of whether said data condition is met or not; and
    in response to determining that said data condition is not met, skipping to a next instruction subsequent to said plurality of adjacent instructions without executing any intermediate ones of said plurality of adjacent instructions not yet executed and without restoring state to data registers, and to continue execution at said next instruction; and in response to determining that said data condition is met, continuing to execute said plurality of adjacent instructions.

14. A non-transitory computer readable medium storing a computer program comprising a skip instruction, which is operable when executed on a data processor to control the data processor to perform the steps of the method according to claim 13.

15. A method of processing data comprising the following steps:

decoding a stream of instructions;

processing said decoded stream of instructions;

in response to a plurality of adjacent instructions within said stream of instructions execution of which is dependent upon a data condition being met and whose execution when said data condition is not met does not change a value stored in any data register:

commence determining whether said data condition is met or not; and commence processing said plurality of adjacent instructions without waiting for a determination of whether said data condition is met or not; and in response to determining that said data condition is not met, skip to a next instruction to be executed after said plurality of adjacent instructions without executing any intermediate ones of said plurality of adjacent instructions not yet executed and without restoring state to data registers, and continue execution at said next instruction.

16. A method of processing data comprising the following steps:

decoding a stream of instructions;

processing said decoded stream of instructions; and in response to identifying within said stream of instructions a plurality of vector instructions for processing vector data elements, each vector instruction comprising a mask controlling which elements in said vector data elements are processed:

commencing determining whether said mask comprises zeros indicating no data elements are to be processed; and commencing processing said plurality of vector instructions without waiting for a determination of whether said mask comprises said zeros; and in response to determining that said mask comprises said zeros, skipping to a next instruction to be executed after said plurality of vector instructions without executing any intermediate ones of said plurality of vector instructions not yet executed and without restoring state to data registers, and continuing execution at said next instruction.

* * * * *